(12) United States Patent
Tu

(10) Patent No.: US 10,101,531 B2
(45) Date of Patent: Oct. 16, 2018

(54) POLARIZATION MODE CONVERTER

(71) Applicant: Huawei Technologies Co., Ltd., Shenzhen (CN)

(72) Inventor: Xin Tu, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/870,211

(22) Filed: Jan. 12, 2018

(65) Prior Publication Data
US 2018/0136393 A1 May 17, 2018

Related U.S. Application Data

(63) Continuation of application No. PCT/CN2015/084265, filed on Jul. 16, 2015.

(51) Int. Cl.
G02B 6/126 (2006.01)
G02B 6/14 (2006.01)
(Continued)

(52) U.S. Cl.
CPC ............ G02B 6/126 (2013.01); G02B 6/125 (2013.01); G02B 6/1228 (2013.01); G02B 6/14 (2013.01);
(Continued)

(58) Field of Classification Search
None
See application file for complete search history.

(56) References Cited

U.S. PATENT DOCUMENTS 7,702,188 B2 * 4/2010 Little ............... G02B 6/1228
385/28
8,855,449 B1 * 10/2014 Roth ................ G02B 6/2773
385/11
(Continued)

FOREIGN PATENT DOCUMENTS

CN 1708718 A 12/2005
CN 101320113 A 12/2008
(Continued)

OTHER PUBLICATIONS

Foreign Communication From a Counterpart Application, European Application No. 15898038.3, Extended European Search Report dated Jun. 1, 2018, 8 pages.
(Continued)

Primary Examiner — Michelle R Connelly
(74) Attorney, Agent, or Firm — Conley Rose, P.C.

(57) ABSTRACT

A polarization mode converter includes a rectangular waveguide, a first tapered waveguide, and a second tapered waveguide. A height of the rectangular waveguide is a first height (H1). A side of the first tapered waveguide is coupled to the rectangular waveguide. A width of the first tapered waveguide changes gradually. A height of the first tapered waveguide is a second height (H2), and H2 is less than H1. The second tapered waveguide is detached from the rectangular waveguide and the first tapered waveguide. A width of the second tapered waveguide changes gradually. A height of the second tapered waveguide is H1. The first tapered waveguide is located between the rectangular waveguide and the second tapered waveguide.

11 Claims, 6 Drawing Sheets

(51) Int. Cl.
*G02B 6/125* (2006.01)
*G02B 6/122* (2006.01)
*G02B 6/27* (2006.01)
*G02B 6/12* (2006.01)

(52) U.S. Cl.
CPC ......... *G02B 6/2726* (2013.01); *G02B 6/2766* (2013.01); *G02B 6/2773* (2013.01); *G02B 2006/12097* (2013.01); *G02B 2006/12152* (2013.01)

(56) References Cited

U.S. PATENT DOCUMENTS

| | | | | |
|---|---|---|---|---|
| 8,923,665 | B2* | 12/2014 | Barwicz | G02B 6/126 385/14 |
| 9,304,254 | B2* | 4/2016 | Oka | G02B 6/0048 |
| 9,523,820 | B1* | 12/2016 | Vermeulen | G02B 6/2733 |
| 9,645,312 | B2* | 5/2017 | Barwicz | G02B 6/126 |
| 2006/0018584 | A1* | 1/2006 | Watts | G02B 6/126 385/11 |
| 2006/0198566 | A1* | 9/2006 | Watts | G02B 6/126 385/11 |
| 2013/0156361 | A1 | 6/2013 | Kojima et al. | |
| 2013/0343695 | A1 | 12/2013 | Ben Bakir et al. | |
| 2014/0270622 | A1 | 9/2014 | Barwicz et al. | |
| 2015/0003782 | A1 | 1/2015 | Oka et al. | |
| 2016/0178842 | A1 | 6/2016 | Goi et al. | |
| 2017/0315294 | A1* | 11/2017 | Socci | G02B 6/126 |

FOREIGN PATENT DOCUMENTS

| | | |
|---|---|---|
| CN | 104252020 A | 12/2014 |
| CN | 204302526 U | 4/2015 |
| EP | 3009869 A1 | 4/2016 |
| WO | 2014207949 A1 | 12/2014 |
| WO | 2015096070 A1 | 7/2015 |

OTHER PUBLICATIONS

Machine Translation and Abstract of Chinese Publication No. CN101320113, Dec. 10, 2008, 12 pages.
Machine Translation and Abstract of Chinese Publication No. CN204302526, Apr. 29, 2015, 20 pages.
Machine Translation and Abstract of International Publication No. WO2015096070, Jul. 2, 2015, 32 pages.
Guan, H., et al., "CMOS-compatible highly efficient polarization splitter and rotator based on a double-etched directional coupler," Optics Express, vol. 22, No. 3, Feb. 10, 2014, pp. 2489-2496.
Sacher, W., et al., "Polarization rotator-splitters in standard active silicon photonics platforms," Optics Express, vol. 22, No. 4., Feb. 24, 2014, 10 pages.
Foreign Communication From a Counterpart Application, International Application No. PCT/CN2015/084265, International Search Report dated Apr. 19, 2016, 11 pages.

* cited by examiner

POLARIZATION MODE CONVERTER

CROSS-REFERENCE TO RELATED APPLICATION

This application is a continuation of International Patent Application No. PCT/CN2015/084265 filed on Jul. 16, 2015, which is hereby incorporated by reference in its entirety.

TECHNICAL FIELD

Embodiments of the present disclosure relate to the field of optoelectronic products, and in particular, to a polarization mode converter.

BACKGROUND

As transmission capacities and speeds of trunk lines in a telecommunications network are increasing, fiber-optic communication has become a main transmission means on a modern information network. A photonic integrated circuit (PIC) chip is a core constituent part of an optical communications module and component. When the chip is connected to an optical fiber, polarization states of optical signals entering the PIC chip from the optical fiber are uncertain because a section of the optical fiber is not strictly circular and other factors such as stress are exerted. When these optical signals in the uncertain polarization state pass through the PIC chip directly, effective refractive indices are different in a transverse electric wave (TE) mode and a transverse magnetic wave (TM) mode in the PIC chip because of restrictions such as a birefringent effect or a waveguide size. Consequently, most components are sensitive to polarization, a polarization dependent loss (PDL) and polarization mode dispersion (PMD) are generated, and further a signal-to-noise ratio of a system is reduced. Currently, to ensure signal transmission quality and eliminate a polarization effect, a PIC chip needs to separately process optical signals in different polarization states. In this case, a polarization mode converter is an indispensable constituent element of a PIC chip.

In other approaches, a polarization mode is converted using two adjacent waveguides of a same height, and widths of the two adjacent waveguides remain unchanged in an optical signal transmission direction. The polarization mode converter has a small process tolerance and a high defect rate.

SUMMARY

Embodiments of the present disclosure provide a polarization mode converter in order to resolve problems of a small process tolerance and a high defect rate of a other approaches polarization mode converter.

According to a first aspect, an embodiment of the present disclosure provides a polarization mode converter, including a rectangular waveguide, where a height of the rectangular waveguide is a first height (H1), a first tapered waveguide, where a side of the first tapered waveguide is connected to the rectangular waveguide, a width of the first tapered waveguide changes gradually, a height of the first tapered waveguide is a second height (H2), and the H2 is less than the H1, and a second tapered waveguide, where the second tapered waveguide is unconnected to the rectangular waveguide, the second tapered waveguide is unconnected to the first tapered waveguide, a width of the second tapered waveguide changes gradually, a height of the second tapered waveguide is the H1, a distance between a first end of the second tapered waveguide and the rectangular waveguide is a first distance, a distance between a second end of the second tapered waveguide and the rectangular waveguide is a second distance, the second distance is greater than the first distance, and the first tapered waveguide is located between the rectangular waveguide and the second tapered waveguide.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
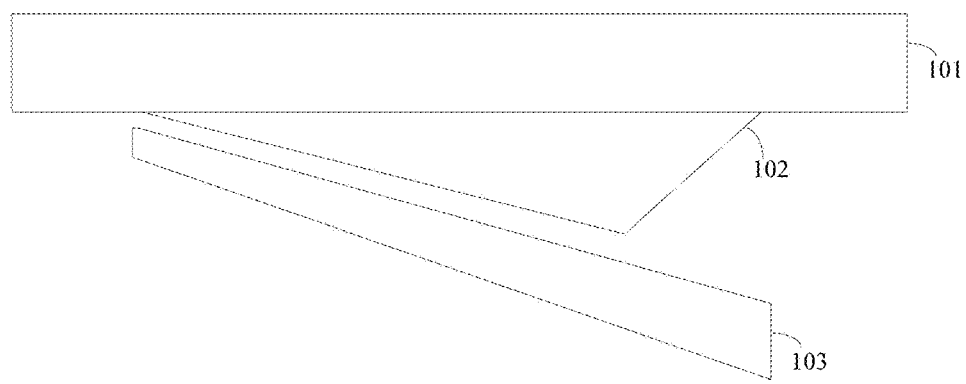
FIG. 1 is a structural diagram of a polarization mode converter according to an embodiment of the present disclosure.

Referring to FIG. 1, FIG. 1 is a polarization mode converter according to an embodiment of the present disclosure, including a rectangular waveguide 101, where a height of the rectangular waveguide 101 is a H1, and the height of the rectangular waveguide 101 in FIG. 1 is a H1, a first tapered waveguide 102, where a side of the first tapered waveguide 102 is connected to the rectangular waveguide 101, a width of the first tapered waveguide 102 changes gradually, a height of the first tapered waveguide 102 is a H2, the H2 is less than the H1, and the height of the first tapered waveguide 102 in FIG. 1 is a H2, where H2<H1, and a second tapered waveguide 103, where the second tapered waveguide 103 is unconnected to the rectangular waveguide 101, the second tapered waveguide 103 is unconnected to the first tapered waveguide 102, a width of the second tapered waveguide changes gradually, a height of the second tapered waveguide 103 is a H1, a distance between a first end of the second tapered waveguide 103 and the rectangular waveguide 101 is a first distance, a distance between a second end of the second tapered waveguide 103 and the rectangular waveguide 101 is a second distance, the second distance is greater than the first distance, and the first tapered waveguide 102 is located between the rectangular waveguide 101 and the second tapered waveguide 103, and the height of the second tapered waveguide 103 in FIG. 1 is the H1.

Optionally, waveguide materials of the rectangular waveguide 101, the first tapered waveguide 102, and the second tapered waveguide 103 in FIG. 1 may be silicon, and materials of covering layers of the rectangular waveguide 101, the first tapered waveguide 102, and the second tapered waveguide 103 may be silica.

Optionally, the first tapered waveguide 102 may be a triangular waveguide shown in FIG. 1, and a side of the triangular waveguide is in contact with and connected to a side of the rectangular waveguide 101.

Optionally, the second tapered waveguide 103 may be a trapezoid waveguide shown in FIG. 1, a lateral side of the trapezoid waveguide is parallel to a side of the triangular waveguide, and a distance between the trapezoid waveguide and the triangular waveguide remains unchanged.

Figure 2:
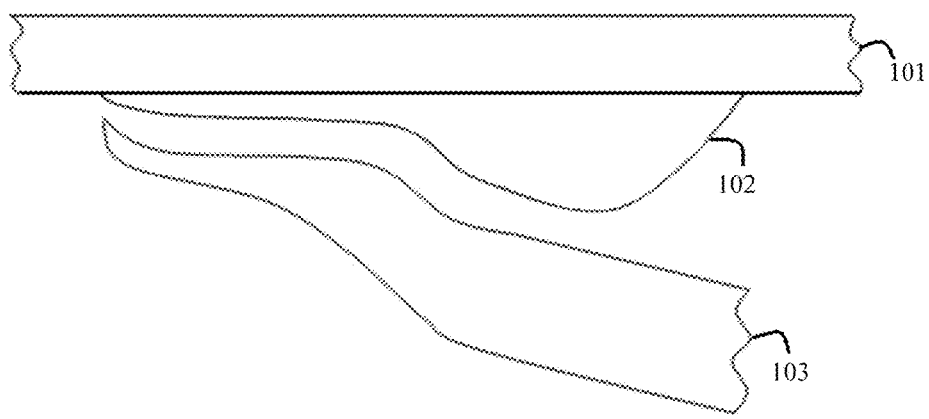
FIG. 2 is a structural diagram of another polarization mode converter according to an embodiment of the present disclosure.

Optionally, the first tapered waveguide 102 may be a waveguide with an arc-shaped profile shown in FIG. 2, a height of the first tapered waveguide 102 is H2, and H2<H1, where a side of the waveguide with the arc-shaped profile is in contact with a side of the rectangular waveguide 101. Certainly, the first tapered waveguide 102 may alternatively have a polygonal profile in another embodiment.

Optionally, the second tapered waveguide 103 may be a waveguide with an arc-shaped profile shown in FIG. 2. Because a waveguide with an arc-shaped or a polygonal profile can better meet light field coupling distribution, coupling efficiency is improved. In this case, a length of a component can be reduced.

Optionally, a ratio of the H2 to the H1, that is H2/H1, is greater than 0.1.

Optionally, a ratio of the H2 to the H1, that is H2/H1, is less than 0.9.

Optionally, a distance between the second tapered waveguide 103 and the first tapered waveguide 102 is less than 1 micrometer.

Figure 3:
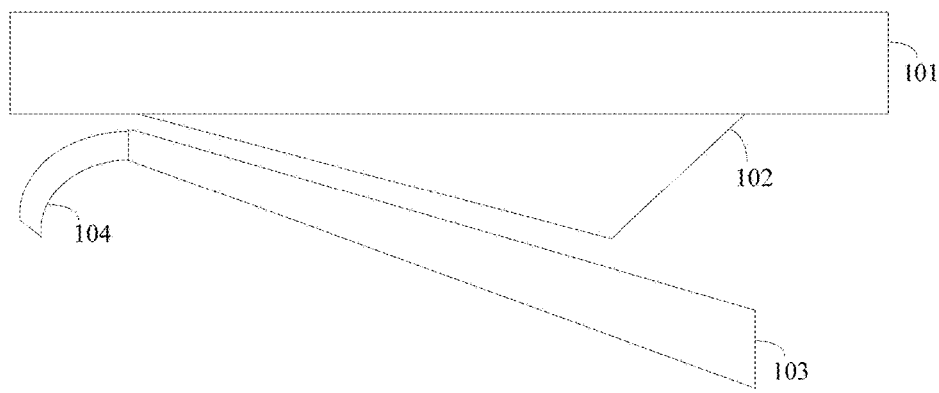
FIG. 3 is a structural diagram of still another polarization mode converter according to an embodiment of the present disclosure.
Figure 4:
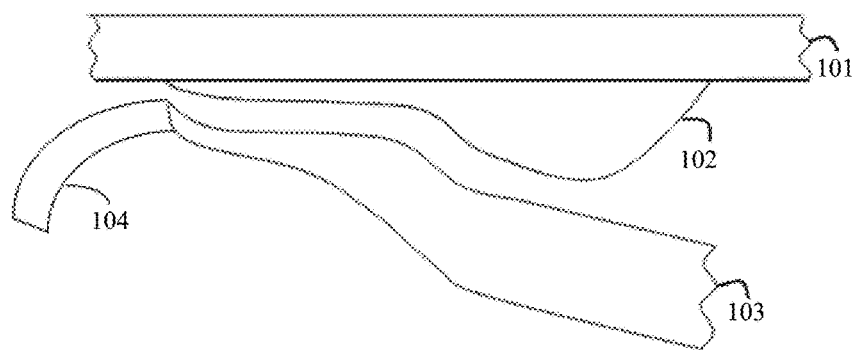
FIG. 4 is a structural diagram of still another polarization mode converter according to an embodiment of the present disclosure.

Optionally, as shown in FIG. 3 and FIG. 4, the polarization mode converter may further include an arc-shaped waveguide 104, where an end of the arc-shaped waveguide 104 is connected to the first end of the second tapered waveguide 103. As shown in FIG. 3 and FIG. 4, the arc-shaped waveguide 104 is located on the left of the second tapered waveguide 103, and when an optical signal is input from a left end of the rectangular waveguide 101, after the arc-shaped waveguide 104 is added, a waveguide refractive index during coupling changes gradually, instead of changing suddenly as before in order to reduce a loss caused by a mode field mismatch. In this case, an insertion loss during TE light input and a conversion loss during TM light input can be reduced.

Optionally, a first end of the rectangular waveguide 101 is configured to receive a first TE signal, a second end of the rectangular waveguide 101 is configured to output the first TE signal, the first end of the rectangular waveguide 101 is close to the first end of the second tapered waveguide 103, and the second end of the rectangular waveguide 101 is close to the second end of the second tapered waveguide 103.

In FIG. 1, the first end of the rectangular waveguide 101 is a left end of the rectangular waveguide 101, the second end of the rectangular waveguide 101 is a right end of the rectangular waveguide 101, the first end of the second tapered waveguide 103 is a left end of the second tapered waveguide 103, and the second end of the second tapered waveguide 103 is a right end of the second tapered waveguide 103. A first TE signal TE-X is input from the left end of the rectangular waveguide 101, and is output from the right end of the rectangular waveguide 101.

Optionally, the first end of the rectangular waveguide 101 is configured to receive a second TM signal, where the second TM signal, when being transmitted in the rectangular waveguide 101, is gradually coupled into the first tapered waveguide 102 and then gradually coupled into the second tapered waveguide 103 to obtain a second TE signal. The second end of the second tapered waveguide 103 is configured to output the second TE signal. The first end of the rectangular waveguide 101 is close to the first end of the second tapered waveguide 103, and the second end of the rectangular waveguide 101 is close to the second end of the second tapered waveguide 103.

In FIG. 1, the first end of the rectangular waveguide 101 is the left end of the rectangular waveguide 101, the second end of the rectangular waveguide 101 is the right end of the rectangular waveguide 101, the first end of the second tapered waveguide 103 is the left end of the second tapered waveguide 103, and the second end of the second tapered waveguide 103 is the right end of the second tapered waveguide 103. A second TM signal TM-Y is input from the left end of the rectangular waveguide 101, the second TM signal TM-Y, when being transmitted in the rectangular waveguide 101, is gradually coupled into the first tapered waveguide 102 and then gradually coupled into the second tapered waveguide 103 to obtain a second TE signal TE-Y, and the second TE signal TE-Y is output from the right end of the second tapered waveguide 103. When the second TM signal TM-Y being transmitted in the rectangular waveguide 101 is gradually coupled into the first tapered waveguide 102, a part of second TM signal TM-Y in the first tapered waveguide 102 has been converted into a TE signal and then gradually coupled into the second tapered waveguide 103 to obtain the second TE signal TE-Y. In this case, the majority of the second TM signal TM-Y has been converted into the TE signal. A similar conversion process is involved in the following embodiments.

When the polarization mode converter in FIG. 1 is used as a polarization beam splitter, signals TE-X and TM-Y are input from the left end of the rectangular waveguide 101. The TE-X signal is output from the right end of the rectangular waveguide 101 while the TM-Y signal is converted into TE-Y by passing through the rectangular waveguide 101, the first tapered waveguide 102, and the second tapered waveguide 103, and then TE-Y is output from the right end of the second tapered waveguide 103 in order to implement beam splitting.

Optionally, the second end of the rectangular waveguide 101 is configured to receive a third TE signal, the first end of the rectangular waveguide 101 is configured to output the third TE signal, the first end of the rectangular waveguide 101 is close to the first end of the second tapered waveguide 103, and the second end of the rectangular waveguide 101 is close to the second end of the second tapered waveguide 103.

In FIG. 1, the first end of the rectangular waveguide 101 is the left end of the rectangular waveguide 101, the second end of the rectangular waveguide 101 is the right end of the rectangular waveguide 101, the first end of the second tapered waveguide 103 is the left end of the second tapered waveguide 103, and the second end of the second tapered waveguide 103 is the right end of the second tapered waveguide 103. A third TE signal TE-M is input from the right end of the rectangular waveguide 101, and is output from the left end of the rectangular waveguide 101.

Optionally, the second end of the second tapered waveguide 103 is configured to input a fourth TE signal, where the fourth TE signal, when being transmitted in the second tapered waveguide 103, is gradually coupled into the first tapered waveguide 102 and then gradually coupled into the rectangular waveguide 101 to obtain a fourth TM signal. The first end of the rectangular waveguide 101 is configured to output the fourth TM signal. The first end of the rectangular waveguide 101 is close to the first end of the second tapered waveguide 103, and the second end of the rectangular waveguide 101 is close to the second end of the second tapered waveguide 103.

In FIG. 1, the first end of the rectangular waveguide 101 is the left end of the rectangular waveguide 101, the second end of the rectangular waveguide 101 is the right end of the rectangular waveguide 101, the first end of the second tapered waveguide 103 is the left end of the second tapered waveguide 103, and the second end of the second tapered waveguide 103 is the right end of the second tapered waveguide 103. A fourth TE signal TE-N is input from the right end of the second tapered waveguide 103, the fourth TE signal TE-N, when being transmitted in the second tapered waveguide 103, is gradually coupled into the first tapered waveguide 102 and then gradually coupled into the rectangular waveguide 101 to obtain a fourth TM signal TM-N, and the fourth TM signal TM-N is output from the left end of the rectangular waveguide 101.

When the polarization mode converter in FIG. 1 is used as a polarization beam combiner, a signal TE-M is input from the right end of the rectangular waveguide 101, a signal TE-N is input from the right end of the second tapered waveguide 103. The signal TE-M is output from the left end of the rectangular waveguide 101 while the signal TE-N is converted into TM-N by passing through the second tapered waveguide 103, the first tapered waveguide 102, and the rectangular waveguide 101, and then TM-N is output from the left end of the rectangular waveguide 101 in order to implement beam combining.

A polarization mode converter, such as a polarization rotary beam splitter or a polarization rotary beam combiner, changes a polarization mode using two adjacent waveguides with a same height, and widths of the two adjacent waveguides remain unchanged using fixed values in an optical signal transmission direction. According to a coupling mode principle of a coupler, a waveguide structure with a fixed width has a corresponding unique optimum operating wavelength. Once an error occurs during processing, the optimum operating wavelength is seriously deviated. Therefore, the operating bandwidth of this type of structure is limited by a waveguide size. In addition, efficiency in coupling and converting an optical signal from a waveguide into another waveguide is very sensitive to a waveguide width and a waveguide length. That is, it is very difficult to ensure that a manufactured waveguide has a width precisely equal to a designed value in an actual processing process, thereby leading to reduced efficiency of optical mode coupling and conversion between waveguides of an actual component, and causing a low process tolerance. Moreover, a complex structure also increases process costs. These factors all limit an application scenario of this type of component. The polarization mode converter provided in the embodiments of the present disclosure may not only be used as a polarization rotary beam splitter, but also be used as a polarization rotary beam combiner. A coupling waveguide structure with a width changing gradually in an optical signal transmission direction is used for the polarization mode converter such that section widths of waveguides in the optical signal transmission direction are different at different locations. In this way, coupling conditions of different wavelengths are met, and an operating bandwidth is extended. In addition, a waveguide width is a varying interval, not a fixed value. Even if a process error results in a waveguide width deviation, a coupling condition can still be met in a large range in order to resolve problems of a low process tolerance, a complex structure, and a small operating bandwidth of a waveguide polarization converter, and to implement a component with a high process tolerance, a simple structure, and a large operating bandwidth.

Figure 5:
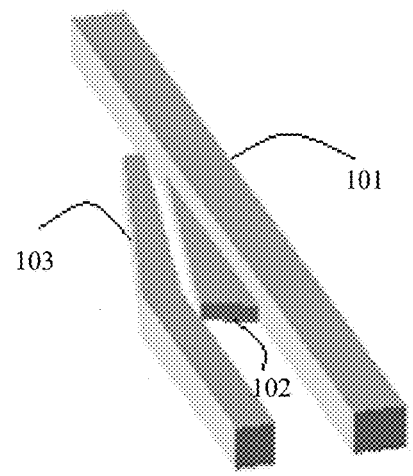
FIG. 5 is a solid figure of a polarization mode converter according to an embodiment of the present disclosure.
Figure 6:
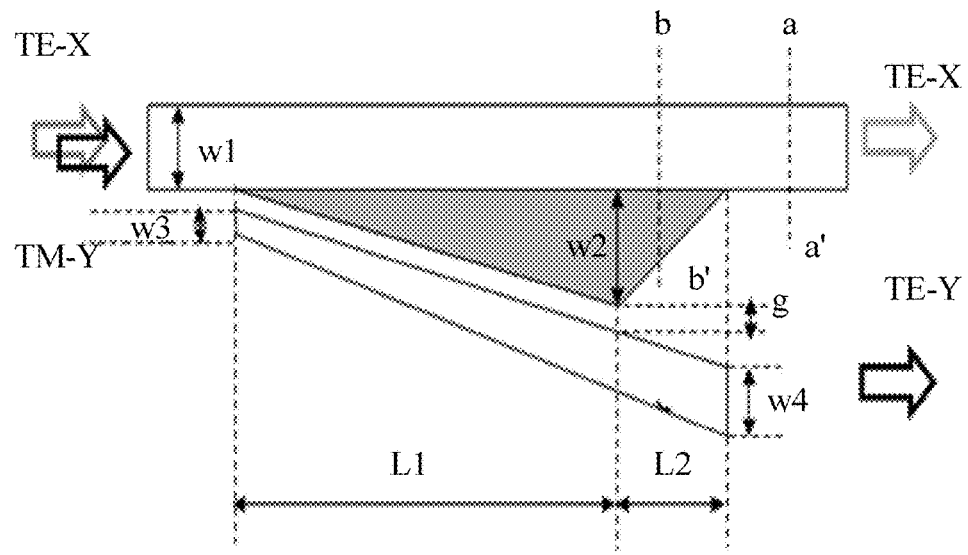
FIG. 6 is a top view of a polarization mode converter according to an embodiment of the present disclosure.
Figure 7:
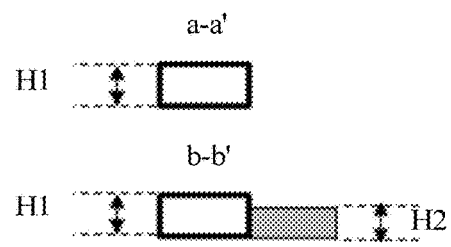
FIG. 7 is a side view of a polarization mode converter according to an embodiment of the present disclosure.

FIG. 5 is a solid figure of a polarization mode converter according to an embodiment of the present disclosure, and FIG. 1 is a top view of FIG. 5. To describe structure parameters of the polarization mode converter more clearly, FIG. 6 and FIG. 7 are used for description. FIG. 6 is a top view, and FIG. 7 is a side view of a-a' and b-b' in FIG. 6. Table 1 shows examples of structure parameter values according to an embodiment of the present disclosure.

TABLE 1

| Parameter | w1 | w2 | W3 | w4 | g | H1 | H2 | L1 | L2 |
| --- | --- | --- | --- | --- | --- | --- | --- | --- | --- |
| Typical value | 500 nanometers (nm) | 500 nm | 200 nm | 372 nm | 200 nm | 220 nm | 90 nm | 93 micrometers (μm) | 7 μm |

Analog simulation is performed on the structure parameter values shown in Table 1 to obtain the following simulation results.

Figure 8:
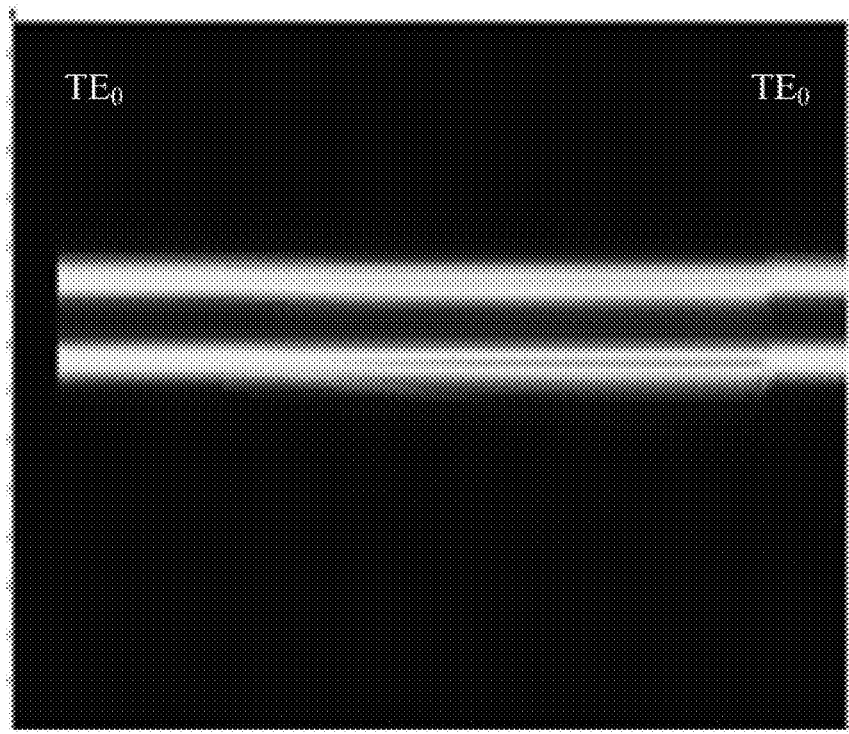
FIG. 8 is an energy distribution diagram of a polarization mode converter according to an embodiment of the present disclosure.

FIG. 8 shows optical energy distribution of TE light with a wavelength of 1550 nm that is input from a left end of a rectangular waveguide. It can be learned that the TE light with the wavelength of 1550 nm directly passes through the rectangular waveguide, and there is almost no energy loss.

Figure 9:
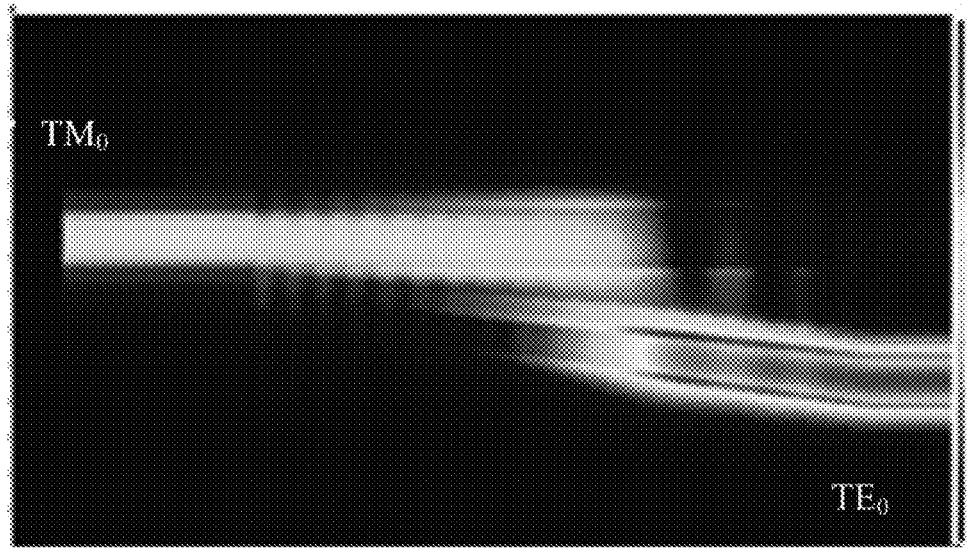
FIG. 9 is an energy distribution diagram of another polarization mode converter according to an embodiment of the present disclosure.

FIG. 9 shows optical energy distribution of TM light with a wavelength of 1550 nm that is input from a left end of a rectangular waveguide. It can be learned that the TM light with the wavelength of 1550 nm is coupled to a first tapered waveguide and a second tapered waveguide from the rectangular waveguide, and is output from a right end of the second tapered waveguide.

An insertion loss of TE light that is input from the left end of the rectangular waveguide and output from a right end of the rectangular waveguide is defined to be 10*lg (energy of the TE light that is output from the right end of the rectangular waveguide/energy of the TE light that is input from the left end of the rectangular waveguide). A conversion loss of the TM light that is input from the left end of the rectangular waveguide and output from the right end of the second tapered waveguide is defined to be 10*lg (energy of the TE light that is output from the right end of the second tapered waveguide/energy of the TM light that is input from the left end of the rectangular waveguide).

Figure 10:
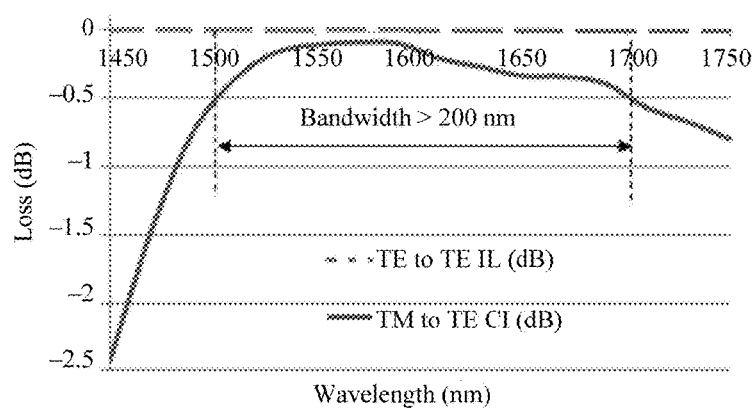
FIG. 10 is a diagram of energy loss of a polarization mode converter according to an embodiment of the present disclosure.

FIG. 10 shows an insertion loss IL resulting from TE light input in a band of 1450 nm to 1750 nm and a conversion loss CI resulting from TM light input in the band of 1450 nm to 1750 nm. It can be learned that, in the entire band, the insertion loss IL resulting from TE light input is less than 0.005 decibel (dB), the conversion loss CI resulting from TM light input is less than 0.5 dB, and a wavelength of a bandwidth at which a loss is less than 0.5 dB exceeds 200 nm.

A crosstalk of the TE light that is input from the left end of the rectangular waveguide and output from the right end of the second tapered waveguide is defined to be 10*lg (energy of the TE light that is output from the right end of the second tapered waveguide/energy of the TE light that is input from the left end of the rectangular waveguide). A conversion loss of the TM light that is input from the left end of the rectangular waveguide and output from the right end of the rectangular waveguide is defined to be 10*lg (energy of the TE light that is output from the right end of the rectangular waveguide/energy of the TM light that is input from the left end of the rectangular waveguide).

Figure 11:
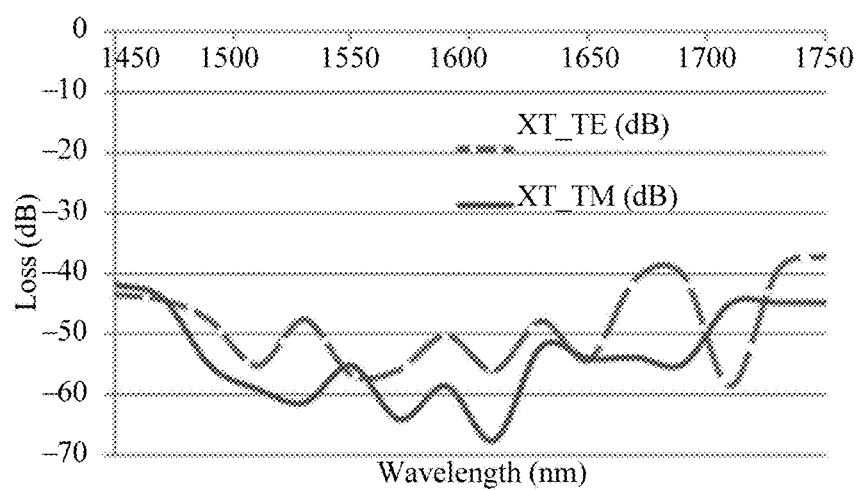
FIG. 11 is a diagram of energy crosstalk of a polarization mode converter according to an embodiment of the present disclosure.

FIG. 11 shows a crosstalk XT_TE resulting from TE light input in a band of 1450 nm to 1750 nm and a crosstalk XT_TM resulting from TM light input in the band of 1450 nm to 1750 nm. It can be learned that, in the entire band, the crosstalk XT_TE resulting from TE light input is less than −35 dB, and the crosstalk XT_TM resulting from TM light input is less than −35 dB.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A polarization mode converter, comprising:
    a rectangular waveguide, wherein a height of the rectangular waveguide comprises a first height (H1);
    a first tapered waveguide, wherein a side of the first tapered waveguide is coupled to the rectangular waveguide, wherein a width of the first tapered waveguide changes gradually, wherein a height of the first tapered waveguide comprises a second height (H2), and wherein the H2 is less than the H1; and
    a second tapered waveguide, wherein the second tapered waveguide is detached from the rectangular waveguide and the first tapered waveguide, wherein a width of the second tapered waveguide changes gradually, wherein a height of the second tapered waveguide comprises the H1, wherein a distance between a first end of the second tapered waveguide and the rectangular waveguide comprises a first distance, wherein a distance between a second end of the second tapered waveguide and the rectangular waveguide comprises a second distance, wherein the second distance is greater than the first distance, and wherein the first tapered waveguide is located between the rectangular waveguide and the second tapered waveguide.

2. The polarization mode converter according to claim 1, wherein the first tapered waveguide comprises a triangular waveguide, and wherein a side of the triangular waveguide is coupled to a side of the rectangular waveguide.

3. The polarization mode converter according to claim 2, wherein the second tapered waveguide comprises a trapezoid waveguide, and wherein a lateral side of the trapezoid waveguide is parallel to another side of the triangular waveguide.

4. The polarization mode converter according to claim 1, wherein a ratio of the H2 to the H1 is greater than 0.1.

5. The polarization mode converter according to claim 1, wherein a ratio of the H2 to the H1 is less than 0.9.

6. The polarization mode converter according to claim 3, wherein a distance between the second tapered waveguide and the first tapered waveguide is less than 1 micrometer.

7. The polarization mode converter according to claim 1, further comprising an arc-shaped waveguide, wherein an end of the arc-shaped waveguide is coupled to the first end of the second tapered waveguide.

8. The polarization mode converter according to claim 1, wherein a first end of the rectangular waveguide is configured to receive a first transverse electric wave (TE) signal, wherein a second end of the rectangular waveguide is configured to output the first TE signal, wherein the first end of the rectangular waveguide is proximate to the first end of the second tapered waveguide, and wherein the second end of the rectangular waveguide is proximate to the second end of the second tapered waveguide.

9. The polarization mode converter according to claim 1, wherein a first end of the rectangular waveguide is configured to receive a second transverse magnetic wave (TM) signal, wherein the second TM signal is gradually coupled into the first tapered waveguide and then gradually coupled into the second tapered waveguide to obtain a second transverse electric wave (TE) signal when transmitted in the rectangular waveguide, wherein the second end of the second tapered waveguide is configured to output the second TE signal, wherein the first end of the rectangular waveguide is proximate to the first end of the second tapered waveguide, and wherein a second end of the rectangular waveguide is proximate to the second end of the second tapered waveguide.

10. The polarization mode converter according to claim 1, wherein a second end of the rectangular waveguide is configured to receive a third transverse electric wave (TE) signal, wherein a first end of the rectangular waveguide is configured to output the third TE signal, wherein the first end of the rectangular waveguide is proximate to the first end of the second tapered waveguide, and wherein the second end of the rectangular waveguide is proximate to the second end of the second tapered waveguide.

11. The polarization mode converter according to claim 1, wherein the second end of the second tapered waveguide is configured to input a fourth transverse electric wave (TE) signal, wherein the fourth TE signal is gradually coupled into the first tapered waveguide and then gradually coupled into the rectangular waveguide to obtain a fourth transverse magnetic wave (TM) signal when transmitted in the second tapered waveguide, wherein a first end of the rectangular waveguide is configured to output the fourth TM signal, wherein the first end of the rectangular waveguide is proximate to the first end of the second tapered waveguide, and wherein a second end of the rectangular waveguide is proximate to the second end of the second tapered waveguide.

* * * * *